US010450989B2

(12) United States Patent
Matsunaga et al.

(10) Patent No.: US 10,450,989 B2
(45) Date of Patent: Oct. 22, 2019

(54) FUEL INJECTION DEVICE FOR INTERNAL COMBUSTION ENGINE

(71) Applicant: MITSUBISHI JIDOSHA KOGYO KABUSHIKI KAISHA, Tokyo (JP)

(72) Inventors: Ayatoshi Matsunaga, Okazaki (JP); Yasuo Yamaguchi, Okazaki (JP); Shinichi Murata, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/115,558

(22) PCT Filed: Mar. 23, 2015

(86) PCT No.: PCT/JP2015/058783
§ 371 (c)(1),
(2) Date: Jul. 29, 2016

(87) PCT Pub. No.: WO2015/146930
PCT Pub. Date: Oct. 1, 2015

(65) Prior Publication Data
US 2017/0030287 A1 Feb. 2, 2017

(30) Foreign Application Priority Data

Mar. 25, 2014 (JP) .................. 2014-061934
Mar. 25, 2014 (JP) .................. 2014-061935
Mar. 25, 2014 (JP) .................. 2014-061936

(51) Int. Cl.
*F02D 41/30* (2006.01)
*F02D 41/06* (2006.01)
(Continued)

(52) U.S. Cl.
CPC ......... *F02D 41/3076* (2013.01); *F02D 17/00* (2013.01); *F02D 41/065* (2013.01);
(Continued)

(58) Field of Classification Search
CPC ..... F02D 2200/0406; F02D 2200/0414; F02D 2200/0602; F02D 41/3094; F02D 41/065;
(Continued)

(56) References Cited

U.S. PATENT DOCUMENTS 6,102,000 A * 8/2000 Shindoh ............... F02D 41/401
123/381
7,316,219 B2 * 1/2008 Yamaguchi ........... B60W 10/06
123/304

(Continued)

FOREIGN PATENT DOCUMENTS

CN         1690393 A    11/2005
CN      101532443 A     9/2009
(Continued)

OTHER PUBLICATIONS

International Preliminary Report on Patentability and Written Opinion of the International Searching Authority (Forms PCT/IB/338, PCT/IB/326, PCT/IB/373 and PCT/ISA/237), dated Oct. 6, 2016 for International Application No. PCT/JP2015/058783, including an English translation.

(Continued)

*Primary Examiner* — Xiao En Mo
(74) *Attorney, Agent, or Firm* — Birch, Stewart, Kolasch & Birch, LLP

(57) ABSTRACT

A fuel injection device for an internal combustion engine includes: a high/low pressure fuel system configured to inject fuel into cylinders 12a to 12d through an in-cylinder injector 44; and a low pressure fuel injection system configured to inject fuel into an intake manifold 14 through an intake path injector 46. An ECU 60 incorporates: an idling stop/start unit 68 that stops the engine when an idling stop condition is satisfied, and restarts the engine when the idling stop condition is no longer satisfied; and a fuel injection control unit 70 that causes, after the idling stop condition is (Continued)

no longer satisfied, fuel remaining in the first fuel injection unit to be injected into the cylinder, before rotation of a crank shaft 32 starts, so that the engine 10 is automatically restarted, and causes fuel injection to be started from the second fuel injection unit when predetermined condition is satisfied.

9 Claims, 8 Drawing Sheets

(51) Int. Cl.
    *F02D 41/38*     (2006.01)
    *F02D 17/00*     (2006.01)
    *F02M 61/14*     (2006.01)
    *F02N 99/00*     (2010.01)
    *F02D 41/04*     (2006.01)
    *F02N 11/08*     (2006.01)

(52) U.S. Cl.
    CPC ..... *F02D 41/3094* (2013.01); *F02D 41/3845* (2013.01); *F02M 61/145* (2013.01); *F02N 99/006* (2013.01); *F02D 41/042* (2013.01); *F02D 2041/389* (2013.01); *F02D 2041/3881* (2013.01); *F02D 2200/0406* (2013.01); *F02D 2200/0414* (2013.01); *F02D 2200/0602* (2013.01); *F02N 11/0814* (2013.01); *F02N 2200/021* (2013.01); *Y02T 10/123* (2013.01)

(58) Field of Classification Search
    CPC .. F02D 41/3076; F02D 17/00; F02D 41/3845; F02D 41/042; F02D 2041/389; F02D 2041/3881; F02N 11/0814; F02N 99/006; F02N 2200/021; F02M 61/145; Y02T 10/123
    See application file for complete search history.

(56) References Cited

U.S. PATENT DOCUMENTS

| | | | | |
|---|---|---|---|---|
| 7,441,541 B2* | 10/2008 | Nakamura | ........... | F02D 41/0087 123/179.4 |
| 7,832,375 B2* | 11/2010 | Dusa | ........... | F02D 41/06 123/179.16 |
| 8,140,247 B2* | 3/2012 | Gibson | ........... | F02D 41/0002 123/179.16 |
| 8,843,260 B2* | 9/2014 | Fukuzawa | ........... | B60W 10/06 701/22 |
| 9,797,333 B2* | 10/2017 | Nakamura | ........... | F02D 41/3005 |
| 2004/0016416 A1 | 1/2004 | Ichihara | ........... | F02D 9/02 123/302 |
| 2004/0099248 A1* | 5/2004 | Ito | ........... | F02D 35/025 123/457 |
| 2004/0159297 A1* | 8/2004 | Kataoka | ........... | F02N 11/0814 123/179.4 |
| 2005/0235959 A1 | 10/2005 | Sadakane et al. | | |
| 2006/0180112 A1* | 8/2006 | Katayama | ........... | F02D 41/065 123/179.4 |
| 2006/0207556 A1* | 9/2006 | Miyazaki | ........... | F02D 41/064 123/431 |
| 2006/0207567 A1* | 9/2006 | Yamaguchi | ........... | B60W 10/06 123/431 |
| 2006/0254564 A1* | 11/2006 | Lewis | ........... | F01L 9/04 123/491 |
| 2007/0289577 A1 | 12/2007 | Yamaguchi et al. | | |
| 2008/0162014 A1* | 7/2008 | Shinohara | ........... | F02D 35/024 701/102 |
| 2009/0099756 A1* | 4/2009 | Demura | ........... | F02D 41/064 701/103 |
| 2009/0271095 A1* | 10/2009 | Kojima | ........... | F02N 11/0814 701/113 |
| 2010/0114462 A1* | 5/2010 | Gibson | ........... | F02D 41/0002 701/113 |
| 2011/0144891 A1* | 6/2011 | Nakamura | ........... | F02D 41/065 701/104 |
| 2013/0000599 A1* | 1/2013 | Okamoto | ........... | F02D 41/065 123/295 |
| 2013/0096804 A1* | 4/2013 | Takagi | ........... | F02D 41/3094 701/104 |
| 2013/0151052 A1 | 6/2013 | Fukuzawa | | |
| 2014/0297159 A1* | 10/2014 | Surnilla | ........... | F02D 41/3094 701/103 |
| 2014/0297162 A1* | 10/2014 | Surnilla | ........... | F02D 41/3094 701/104 |
| 2015/0047350 A1* | 2/2015 | Pursifull | ........... | F02D 19/0647 60/611 |
| 2015/0219036 A1* | 8/2015 | Gibson | ........... | F02D 41/3076 123/299 |
| 2016/0131071 A1* | 5/2016 | Sugimoto | ........... | F02D 41/1498 123/436 |
| 2017/0328267 A1* | 11/2017 | Hotta | ........... | F02B 27/0294 |

FOREIGN PATENT DOCUMENTS

| | | |
|---|---|---|
| EP | 1 154 154 A2 | 11/2001 |
| EP | 2 098 711 A1 | 9/2009 |
| JP | 2004-036561 A | 2/2004 |
| JP | 2004-332598 A | 11/2004 |
| JP | 2006-144804 A | 6/2006 |
| JP | 2006-258032 A | 9/2006 |
| JP | 2006-348908 A | 12/2006 |
| JP | 2007-170205 A | 7/2007 |
| JP | 2008215192 A * | 9/2008 ........... F02D 41/047 |
| JP | 2008-240620 A | 10/2008 |
| JP | 2010-043602 A | 2/2010 |
| JP | 2010-229995 A | 10/2010 |
| JP | 2010-286906 A | 12/2010 |
| JP | 2011-220184 A | 11/2011 |
| JP | 2012-13050 A | 1/2012 |
| JP | 2013-119835 A | 6/2013 |

OTHER PUBLICATIONS

Extended European Search Report dated Sep. 25, 2017 in corresponding EP Application No. 15768804.5.
Second Office Action for Chinese Application No. 201580015219.1, dated Mar. 6, 2019.
Chinese Office Action and Search Report, dated Oct. 31, 2018, for Chinese Application No. 201580015219.1 is provided, along with an English translation.

* cited by examiner

FUEL INJECTION DEVICE FOR INTERNAL COMBUSTION ENGINE

TECHNICAL FIELD

The present disclosure relates to a fuel injection device for an internal combustion engine installed in a vehicle having what is known as an idling stop function of forcibly stopping idling of the engine when the vehicle is at a halt.

BACKGROUND

A multipoint fuel injection device is known as a fuel injection control unit for an internal combustion engine installed in a vehicle. The multipoint fuel injection device includes: an in-cylinder injector that injects fuel into cylinders; and an intake path injector that injects fuel into an intake port, and controls the fuel injection through the in-cylinder injector and the fuel injection through the intake path injector in accordance with a driving state.

When the multipoint fuel injection device is used, exhaust gas can be purified with improved acceleration response and fuel efficiency. The fuel injection device injects fuel into the intake path when the engine is in a low load-low speed region to achieve a high intake air-fuel mixing performance for better ignition performance, and uses the fuel injection from both the intake path injector and the in-cylinder injector when the engine is in a high load-high speed region.

What is known as an idling stop function of forcibly stopping idling of the engine when the vehicle is at a halt has been featured in attempts to improve fuel efficiency.

The engine of a vehicle stops in two situations: a situation where the driving is ended; and a situation where the vehicle is brought to a halt but is intended to be restarted. In the former situation, an ignition key is turned OFF. The latter situation is achieved when any of the following conditions is satisfied: the vehicle speed is zero, the braking pedal has been stepped on, the accelerator operation amount is zero, the lever is set to be in a driving range, and the like. The engine in a vehicle having the idling stop function is stopped by an operation of an idling stop unit, in an ECU and the like, performed when a condition in question is satisfied.

A hybrid vehicle disclosed in Patent Document 1 is equipped with an internal combustion engine including: an in-cylinder fuel supply path including an in-cylinder injector; an intake path fuel supply path including an intake path injector; and an idling stop unit. This disclosed hybrid vehicle includes a unit that closes a relief valve of the in-cylinder fuel supply path at the time of idling stop, so that fuel pressure can be maintained at a high level. In this condition, fuel is injected into a cylinder from the in-cylinder fuel supply path when the engine is restarted after the idling stop condition is no longer satisfied, in an aim to ensure smooth start performance and prevent exhaust air purification function from deteriorating.

Patent Documents 2 and 3 each disclose an internal combustion engine that is installed in a vehicle and includes a control unit that drives a fuel pump before the engine is restarted so that fuel pressure in a fuel supply path rises to a level required for the starting by the time of the restarting of the engine, after the idling stop has been terminated with the idling stop condition no longer satisfied.

CITATION LIST

Patent Literature

Patent Document 1: Japanese Patent Application Laid-open No. 2006-258032

Patent Document 2: Japanese Patent Application Laid-open No. 2012-13050

Patent Document 3: Japanese Patent Application Laid-open No. 2013-119835

SUMMARY

Technical Problem

A vehicle including a multipoint fuel injection device and having an idling stop unit is required to achieve both swift restarting after the idling stop has been terminated and optimum driving after the restarting in terms of exhaust gas characteristics, fuel efficiency, and the like.

The intake pressure of the intake path changes while the engine is stopped due to the idling stop to be equivalent to atmospheric pressure. Thus, the amount of intake air is likely to be large, resulting in high actual compression pressure, during a few combustion cycles after the initial explosion in the restarting. Thus, knocking is more likely to occur in situations involving high intake air temperature and high engine temperature. The knocking thus occurring leads to deteriorated drivability and noise, vibration, and harshness (NVH) immediately after the starting.

While the engine is stopped, the fuel pump does not operate and thus the fuel pressure in the fuel supply path is low. Thus, there might be cases where the engine cannot be swiftly restarted due to the delay of fuel injection into the cylinder.

Patent Document 1 discloses no solution for preventing the knocking from occurring at the time of restarting after the idling stop has been terminated. The fuel is injected into the cylinder without measuring the fuel pressure in the in-cylinder fuel supply path, at the time of restarting after the idling stop has been terminated. Thus, there might be cases where the engine cannot be swiftly restarted because the fuel cannot be injected into a cylinder in a relatively high pressure state.

The fuel is evenly injected into a plurality of cylinders regardless of how operations in the cylinders have stopped at the time of idling stop. As a result, the fuel is injected even into a cylinder in which the operation has stopped during an exhaust stroke. When this happens, the unburnt fuel might be discharged into an exhaust path, and thus the exhaust gas quality might be deteriorated.

The control unit disclosed in Patent Documents 2 and 3 requires a long period of time for raising the fuel pressure in the fuel supply path up to a level required for the engine start after the idling stop condition is no longer satisfied, and thus the swift starting cannot be achieved.

The present invention is made in view of the problems described above, and an object of at least one embodiment of the present invention is to achieve swift restarting after idling stop has been terminated and prevent knocking from occurring at the time of restarting to prevent drivability, NVH, and the like immediately after the engine restart from deteriorating.

Solution to Problem (1) A fuel injection device for an internal combustion engine according to at least one embodiment of the present invention includes: a first fuel injection unit configured to inject fuel into a cylinder of the internal combustion engine; a second fuel injection unit configured to inject fuel into an intake path of the internal combustion engine; an automatic restarting unit configured to automatically restart the internal combustion engine; and a fuel injection control unit configured to cause, when the internal combustion engine is to be automatically restarted, fuel remaining in the first fuel injection unit to be injected before rotation of a crank shaft starts so that the internal combustion engine is automatically restarted, and cause, when a predetermined condition is satisfied, the second fuel injection unit to start injecting the fuel.

In the configuration in (1), the intake pressure of the intake path changes while the engine is stopped due to the idling stop to be equivalent to atmospheric pressure. Thus, the amount of intake air is likely to be large, resulting in high actual compression pressure, during a few combustion cycles after the initial explosion in the restarting.

Thus, in the present invention, the fuel injection control unit causes only the first fuel injection unit to inject fuel into the cylinder at the time of restarting. Thus, the amount of intake air supplied to the cylinder can be made small, and cooling inside the cylinder can be achieved with a cooling effect of the injected fuel. Thus, swift restarting can be achieved with the compression pressure in the cylinder prevented from increasing and knocking prevented from occurring.

When a predetermined condition for preventing the knocking is satisfied, switching to the fuel injection through the second fuel injection unit is performed or the fuel injection by the first fuel injection unit and the fuel injection by the second fuel injection unit are concurrently performed. Through the multipoint fuel injection, premixing with a small amount of intake air is facilitated, whereby the exhaust gas quality can be prevented from deteriorating at the time of restarting.

The fuel remaining in the first fuel injection unit is injected before the rotation of the crank shaft is started by the starter.

Thus, the fuel can be injected from the first fuel supply path into a cylinder that has low in-cylinder pressure because the rotation of the crank shaft has not started (that is, an operation of a piston has not started), whereby the fuel injection is facilitated.

(2) In some embodiments, the internal combustion engine further includes a crank angle sensor configured to measure a crank angle to detect a stroke of the internal combustion engine, and the predetermined condition includes detecting that a predetermined number of strokes has been completed after the internal combustion engine being restarted, in the configuration described in (1).

In the configuration in (2), the fuel injection is performed by the first fuel injection unit during a few cycles after the initial explosion. Thus, the knocking can be surely prevented from occurring at the time of the restarting, whereby improved drivability and NVH can be achieved.

(3) In some embodiments, the internal combustion engine further includes an intake pressure sensor configured to measure intake pressure in the intake path, and the predetermined condition includes a detected value from the intake pressure sensor being equal to or smaller than a predetermined intake pressure value, in the configuration described in (2).

The predetermined condition further includes the condition that the intake pressure is equal to or lower than a predetermined intake pressure value. Thus, the knocking can be surely prevented from occurring at the time of the restarting, whereby the improved drivability and NVH can be achieved. Furthermore, through the multipoint fuel injection, the premixing with a small amount of intake air is facilitated, whereby the exhaust gas quality can be prevented from deteriorating at the time of restarting.

(4) In some embodiments, the internal combustion engine further includes an intake temperature sensor configured to measure a temperature of intake air in the intake path, and the fuel injection control unit is configured to cause the second fuel injection unit to start injecting the fuel while changing the predetermined number of strokes in accordance with a detected result from the intake temperature sensor, in the configuration described in (3).

Thus, the knocking can be more surely prevented from occurring at the time of the restarting.

(5) In some embodiments, the internal combustion engine further includes a fuel pressure sensor configured to measure pressure of the fuel supplied to the first fuel injection unit, and the fuel injection control unit is configured to select a cylinder having in-cylinder pressure sufficient for injection of the fuel remaining in the first fuel injection unit, in accordance with a measured value from the fuel pressure sensor, and cause the fuel remaining in the first fuel injection unit to be injected into the selected cylinder, in the configuration described in any one of (1) to (4).

In the configuration in (5), the intake pressure of the intake path changes while the engine is stopped due to the idling stop to be equivalent to atmospheric pressure. Thus, the amount of intake air is likely to be large, resulting in high actual compression pressure, during a few combustion cycles after the initial explosion in the restarting.

Thus, in the present invention, the fuel injection control unit causes only the first fuel injection unit to inject fuel into the cylinder at the time of restarting. Furthermore, the fuel pressure sensor measures the fuel pressure of the fuel remaining in the first fuel injection unit, and thus a cylinder with in-cylinder pressure suitable for injection of the fuel remaining in the first fuel injection unit is selected. Then, the fuel remaining in the first fuel injection unit is injected into the cylinder thus selected.

Thus, the fuel remaining in the first fuel injection unit is injected into the cylinder, the amount of intake air supplied to the cylinder can be made small, and cooling inside the cylinder can be achieved with the cooling effect of the injected fuel. Thus, the compression pressure in the cylinder is prevented from increasing and knocking is prevented from occurring, whereby the drivability and the NVH as well as the quality of the exhaust gas immediately after the starting can be prevented from deteriorating.

A low air-fuel ratio can be achieved by the fuel injection from the first fuel injection unit to improve the ignition performance. Furthermore, the fuel can be swiftly supplied into the cylinder without waiting for an operation of the fuel pump. Thus, swift restarting can be achieved after the idling stop has been terminated.

Furthermore, the fuel pressure in the first fuel supply path is measured, and a cylinder with in-cylinder pressure suitable for injection of the fuel remaining in the first fuel injection unit is selected by the fuel injection control unit. Then, the fuel is injected into the cylinder thus selected. Thus, the fuel can be surely injected into the cylinder.

The knocking does not occur when the combustion cycle is performed for several times after the restarting through the injection of fuel into the cylinder so that intake pressure and the intake air temperature become low. Thus, the switching to the fuel injection from the second fuel supply path may be performed, or the fuel injection from the first fuel supply path and the fuel injection from the second fuel supply path may be concurrently performed.

(6) In some embodiments, the fuel injection control unit is configured to select a first cylinder in which an operation has stopped during a compression stroke when the fuel pressure of the first fuel injection unit is equal to or larger than a first threshold, select a second cylinder in which an operation has stopped in a region corresponding to an intake stroke or the first half of the compression stroke when the fuel pressure of the first fuel injection unit is equal to or larger than a second threshold that is lower than the first threshold, select a third cylinder in which an operation has stopped in a region corresponding to immediately before the intake stroke or the first half of the intake stroke when the fuel pressure of the first injection unit is smaller than the second threshold, and cause the first fuel injection unit to perform fuel injection starting from the first cylinder when the fuel pressure of the remaining fuel detected by the fuel pressure sensor is equal to or larger than the first threshold, in the configuration described in (5).

Thus, the fuel injection control unit selects the first cylinder in which the operation has stopped during the compression stroke when the fuel pressure of the first fuel injection unit is equal to or larger than the first threshold, so that the fuel remaining in the first fuel injection unit is injected into the first cylinder.

The fuel injection control unit selects the second cylinder in which the operation has stopped in the region corresponding to the intake stroke (preferably, the second half of the intake stroke) or the first half of the compression stroke when the fuel pressure of the first fuel injection unit is equal to or larger than the second threshold that is lower than the first threshold, so that the fuel remaining in the first fuel injection unit is injected into the second cylinder.

The fuel injection control unit selects the third cylinder in which an operation has stopped in the region corresponding to immediately before the intake stroke or the first half of the intake stroke when the fuel pressure of the first injection unit is smaller than the second threshold, so that the fuel remaining in the first fuel injection unit is injected into the third cylinder.

The first and the second thresholds are set based on fuel pressure suitable for the fuel injection while taking the in-cylinder pressure of a cylinder into which the fuel is injected as soon as the engine is restarted into consideration.

In the configuration in (6), the fuel is injected into the cylinder in which the operation has stopped during the compression stroke, when the fuel pressure of the fuel remaining in the first fuel injection unit is equal to or larger than the first threshold at the time of idling stop. Thus, swift transition to the combustion stroke can be achieved, whereby the swift restarting can be achieved.

The remaining fuel is injected into the cylinder in which the operation has stopped in the region corresponding to the intake stroke (preferably, the second half of the intake stroke) or the first half of the compression stroke when the fuel pressure of the remaining fuel is smaller than the first threshold. Thus, the fuel can be surely injected into the cylinder, and can be prevented from being injected into a cylinder in which an operation has stopped in the exhaust stroke. Thus, the exhaust gas quality can be prevented from deteriorating.

(7) In some embodiments, an automatic stopping unit configured to automatically stop the internal combustion engine when a predetermined condition is satisfied and a high pressure fuel pump configured to send the fuel to the first fuel injection unit are further provided, and the fuel injection control unit is configured to cause, when the predetermined condition for automatic stopping is satisfied while the internal combustion engine is driven by the second fuel injection unit, the high pressure fuel pump to operate so that pressure of the fuel remaining in the first fuel injection unit rises, before the automatic stopping unit stops the internal combustion engine, in the configuration described in any one of (1) to (6).

In the configuration in (7), when the first predetermined condition, that is, the idling stop condition is satisfied while the driving in a low load region with the second fuel injection unit is in process, the high pressure fuel pump is operated before the automatic stopping unit stops the internal combustion engine, so that the fuel pressure in the first fuel injection unit rises.

Thus, the fuel remaining in the first fuel supply path is injected into the cylinder for several combustion cycles after the initial explosion in the restarting or before the rotation of the crank shaft is started by the starter. Thus, the amount of intake air supplied to the cylinder can be made small, and cooling inside the cylinder can be achieved with the cooling effect of the injected fuel.

Thus, the knocking can be prevented from occurring with the compression pressure in the cylinder prevented from rising, and the drivability and the NVH as well as the exhaust gas quality immediately after the starting can be prevented from deteriorating. The fuel is injected not from the second fuel injection unit but from the first fuel injection unit. Thus, a low air-fuel ratio can be achieved to improve the ignition performance.

Furthermore, when the engine 10 is restarted, the fuel can be injected into the cylinder without waiting for the operation of the fuel pump. Thus, swift starting can be achieved, and with the period involving no operations of the fuel pump, pump driving friction can be reduced, whereby the fuel efficiency can be improved.

(8) In some embodiments, a fuel pressure sensor configured to measure pressure of the fuel supplied to the first fuel injection unit is provided, and the fuel injection control unit is configured to stop the second fuel injection unit so as to stop the internal combustion engine when a measured value from the fuel pressure sensor is equal to or larger than a predetermined pressure value, and operate the high pressure fuel pump until rotation of the internal combustion engine stops when the measured value from the fuel pressure sensor is smaller than the predetermined pressure value, in the configuration described in (7).

In the configuration in (8), the fuel injection control unit stops the second fuel injection unit so that the internal combustion engine is stopped, when the measured value from the fuel pressure sensor is equal to or larger than the predetermined pressure value. Thus, the fuel pressure of the fuel remaining in the first fuel injection unit can be maintained at a high level, and the pump driving friction can be reduced.

The high pressure fuel pump is operated until the rotation of the internal combustion engine stops when the measured value from the fuel pressure sensor is smaller than the predetermined pressure value. Thus, the fuel pressure of the fuel remaining in the first fuel injection unit can be prepared for the time of restarting.

(9) In some embodiments, the fuel injection control unit is configured to drive the internal combustion engine by using the second fuel injection unit when the internal combustion engine is in a low load state, in the configuration described in any one of (1) to (8).

In the configuration in (9), the fuel and the intake air are evenly mixed in the low load region so that the excellent combustion can be maintained in the low load region.

Furthermore, the driving in the low load range involves no operation of a high pressure fuel pump, whereby the pump driving friction can be reduced.

Advantageous Effects

In the present invention, fuel injected into a cylinder by using fuel pressure in a first fuel supply system at the time of restarting after idling stop is terminated. Thus, swift restarting involving no occurrence of knocking can be achieved, excellent drivability immediately after the starting can be achieved, and the quality of exhaust gas and NVH can be prevented from deteriorating.

DETAILED DESCRIPTION

Embodiments of the present invention will now be described in detail with reference to the accompanying drawings. It is intended, however, that unless particularly specified otherwise, dimensions, materials, shapes, relative positions and the like of components described in the embodiments shall be interpreted as being merely illustrative: the scope of the present invention is not limited to these.

For example, expressions representing relative or absolute positions, such as "in a direction", "along a direction", "parallel with", "orthogonal to", "center", and "concentric" do not only represent exactly what they mean, but also cover positions displaced by tolerances or relatively displaced to such a degree that the same functions can be achieved.

For example, expressions representing equal levels among things, such as "the same", "equal", and "identical" do not only mean exactly equal levels, but also cover slightly different levels that differ from each other by tolerances or to such a degree that the same functions can be achieved.

For example, expressions representing shapes, such as rectangular or cylindrical shapes do not only mean rectangular or cylindrical shapes in a geometrically exact sense, but also cover like shapes including irregularities or chamfered surfaces to such a degree that the same functions can be achieved.

In addition, expressions representing "comprising", "including", "containing", "provided with", and "having" one component are not exclusive expressions that exclude other components.

Figure 1:
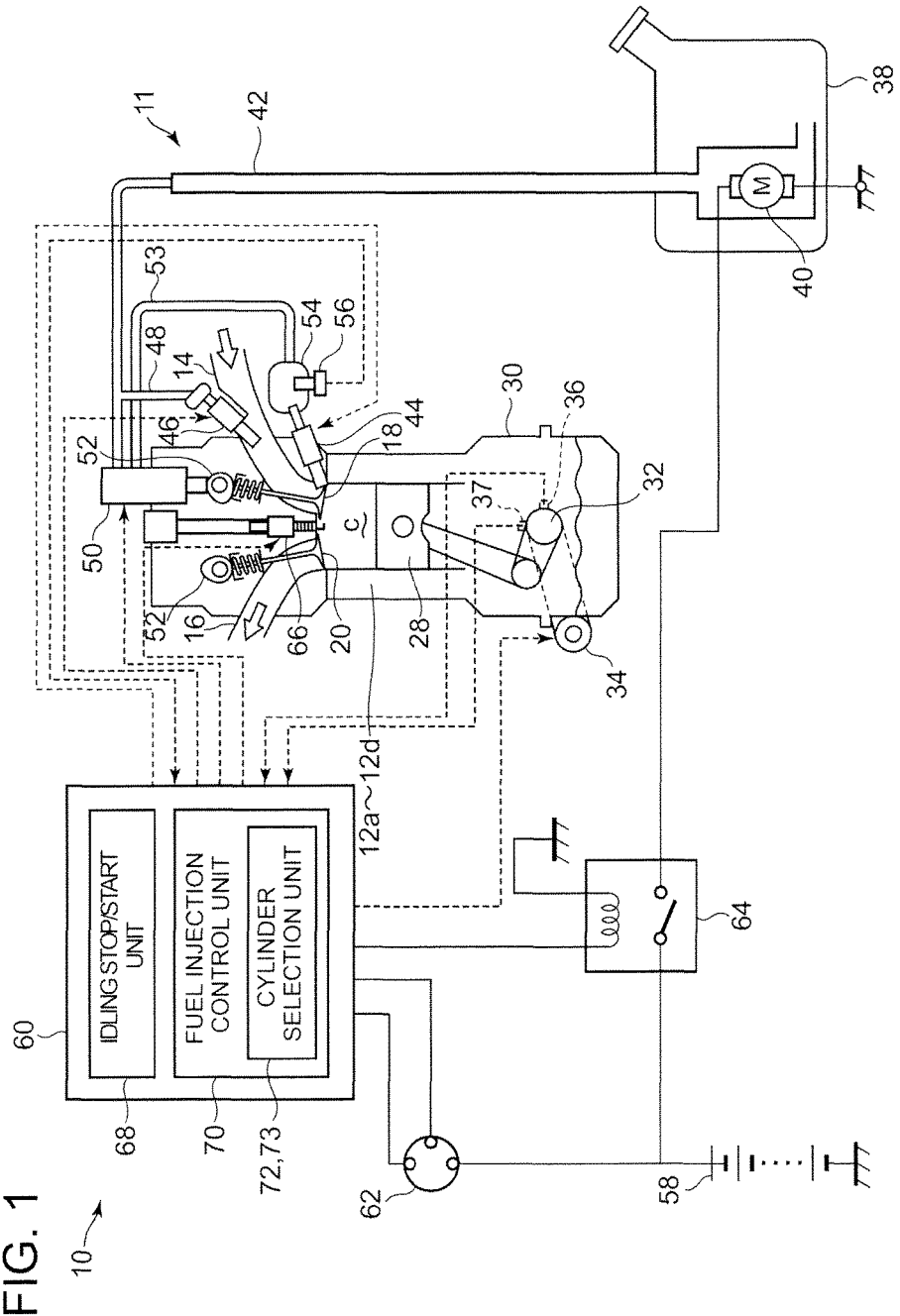
FIG. 1 is a diagram illustrating a schematic configuration of a fuel injection device of an engine according to embodiments of the present invention.
Figure 2:
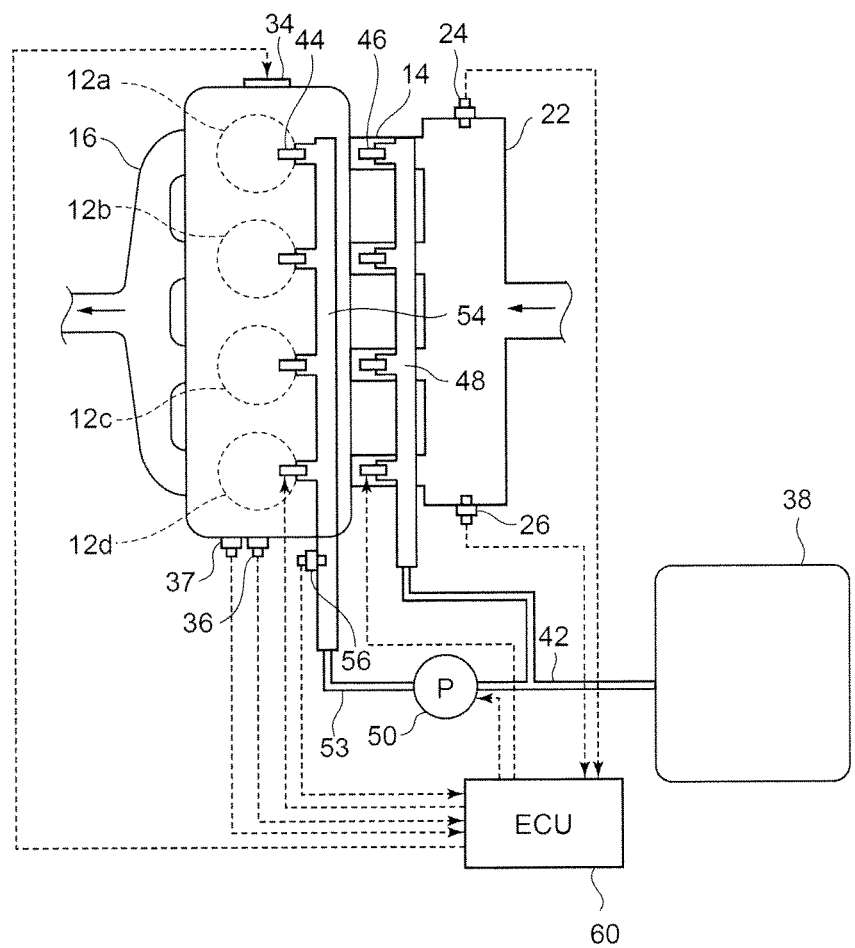
FIG. 2 is a schematic plan view illustrating a configuration of the fuel injection device.

A schematic configuration of a fuel injection device of an engine according to the present invention is described with reference to FIGS. 1 and 2. In FIG. 1 and FIG. 2, a petrol engine (hereinafter, referred to as "engine") 10 installed in a vehicle is an in-line four-cylinder engine including a plurality of, that is, four cylinders 12a to 12d. Each cylinder is connected to an intake manifold 14 and an exhaust manifold 16. The intake manifold 14 is connected to a surge tank 22. An intake valve 18 is provided to each outlet of the intake manifold 14. An exhaust valve 20 is provided to each inlet of the exhaust manifold 16. The surge tank 22 is provided with an intake pressure sensor (MAP sensor) 24 that measures the pressure of intake air and an intake temperature sensor 26 that measures the temperature of the intake air.

Each of the cylinders 12a to 12d incorporates a piston 28 that reciprocates in accordance with combustion in a combustion chamber c. A crank chamber 30 accommodating a crank shaft 32 is disposed below each of the cylinders 12a to 12d. A starter 34, a crank angle sensor 36, and a number of rotations sensor 37 are provided on an outer side of the crank chamber 30. At the time of engine start, the starter 34 rotates the crank shaft 32, the crank angle sensor 36 measures a crank angle, and the number of rotations sensor 37 measures the number of rotations of the crank shaft 32.

Next, a fuel supply system of the engine 10 is described. Fuel stored in a fuel tank 38 is discharged to a low pressure fuel supply pipe 42 by a low pressure fuel pump 40 incorporated in the fuel tank 38. The low pressure fuel supply pipe 42 is connected to each intake path of the intake manifold 14 via the low pressure fuel distribution pipe 48. An intake path injector 46 is provided in a connection portion between each intake path of the intake manifold 14 and the low pressure fuel supply pipe 42.

The low pressure fuel supply pipe 42 and the intake path injector 46 form a low pressure fuel system (second fuel injection unit).

The low pressure fuel supply pipe 42 has one flow path connected to a high pressure fuel supply pipe 53 and a high pressure fuel distribution pipe 54 via a high pressure fuel pump 50. The high pressure fuel distribution pipe 54 is connected to each of the cylinders 12a to 12d. An in-cylinder injector 44 is provided in a connection portion between each cylinder and the high pressure fuel distribution pipe 54.

The fuel, discharged to the low pressure fuel supply pipe 42 by the low pressure fuel pump 40, is sent to the high pressure fuel pump 50, and is also supplied to each intake path of the intake manifold 14 through the low pressure fuel distribution pipe 48 and the intake path injector 46.

A cam mechanism 52 drivingly opens and closes the intake valve 18 and the exhaust valve 20, in accordance with an operation of the crank shaft 32. The high pressure fuel pump 50 supplies fuel to the high pressure fuel distribution pipe 54, in accordance with an operation of the cam mechanism 52, under control performed by an ECU 60 described later through an instruction. The fuel sent to the high pressure fuel pump 50 to have high pressure is supplied to the cylinders 12a to 12d through the high pressure fuel supply pipe 53 and the high pressure fuel distribution pipe (high pressure delivery pipe) 54, and is injected into the combustion chamber c of each cylinder through the in-cylinder injector 44. The high pressure fuel distribution pipe 54 is provided with the fuel pressure sensor 56 that measures the fuel pressure.

The in-cylinder injector 44, the high pressure fuel pump 50, the high pressure fuel supply pipe 53, and the high pressure fuel distribution pipe 54 form a high pressure fuel system (first fuel injection unit).

A vehicle with the engine 10 is provided with the engine control unit (ECU) 60 that controls the driving of an in-vehicle battery 58 and the engine 10. The ECU 60 starts operating when a driver operates an ignition switch 62. The power is supplied to the low pressure fuel pump 40 from the in-vehicle battery 58 via a relay 64 under an instruction issued from the ECU 60, and thus the low pressure fuel pump 40 operates. The operations of an ignition plug 66, the in-cylinder injector 44, and the intake path injector 46 are controlled under an instruction from the ECU 60.

The ECU 60 incorporates an idling stop/start unit 68 and a fuel injection control unit 70. The ECU 60 receives measured values from the intake pressure sensor 24, the intake temperature sensor 26, the crank angle sensor 36, the number of rotations sensor 37, and the fuel pressure sensor 56.

The idling stop unit/start 68 controls operations of the ignition plug 66, the starter 34, and the like, and thus stops the engine 10 when any of the following idling stop conditions is satisfied: the vehicle speed is zero, the braking pedal is depressed, the accelerator operation amount is zero, and the lever is set to be in a driving range. The idling stop/start unit 68 restarts the engine 10 when the idling stop condition is no longer satisfied.

The fuel injection control unit 70 controls the operations of the in-cylinder injector 44, the intake path injector 46, and the ignition plug 66 at the time of restarting, occurring when the idling stop condition that has been satisfied to stop the engine 10 is no longer satisfied.

The fuel injection control unit 70 includes cylinder selection units 72 and 73 that select a cylinder in the middle of a compression stroke, in the middle of an intake stroke, and the like based on a detected value from the crank angle sensor 36 input to the ECU 60, at the time of restarting with the idling stop condition no longer satisfied. The cylinder selection units 72 and 73 select a cylinder to which the fuel can be supplied in accordance with the fuel pressure of the fuel remaining in the high pressure fuel distribution pipe 54, so that the fuel is sequentially injected into the cylinders thus selected through the in-cylinder injector 44.

First Embodiment

A procedure of operations is described with reference to FIG. 3. The operations are performed when the idling stop condition is satisfied, the idling stop/start unit 68 stops the engine 10, and then the engine 10 is restarted by the control performed by the fuel injection control unit 70 with the idling stop condition no longer satisfied.

Figure 3:
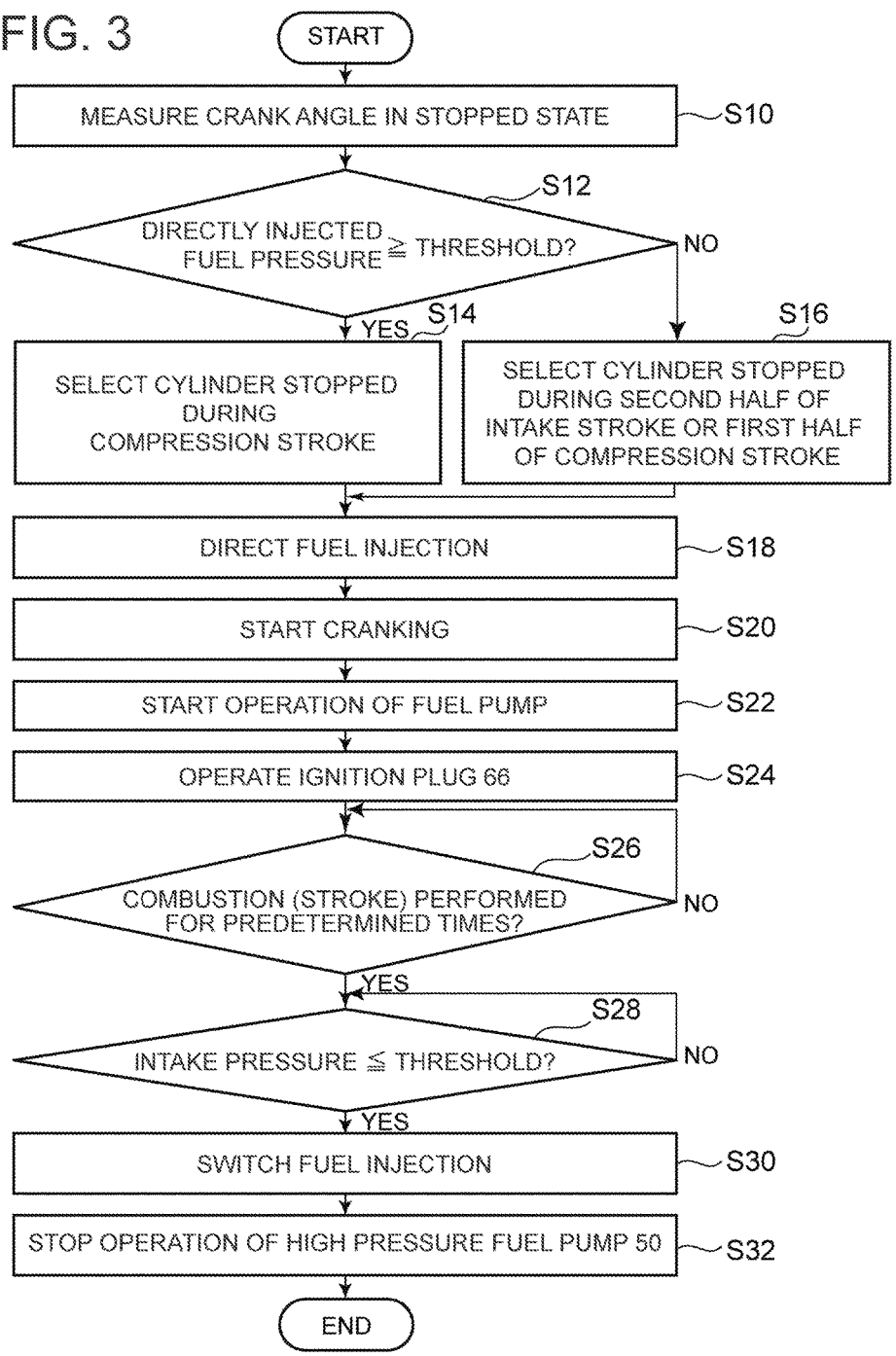
FIG. 3 is a flowchart illustrating a procedure of operations performed by a fuel injection device according to a first embodiment of the present invention.
Figure 4:
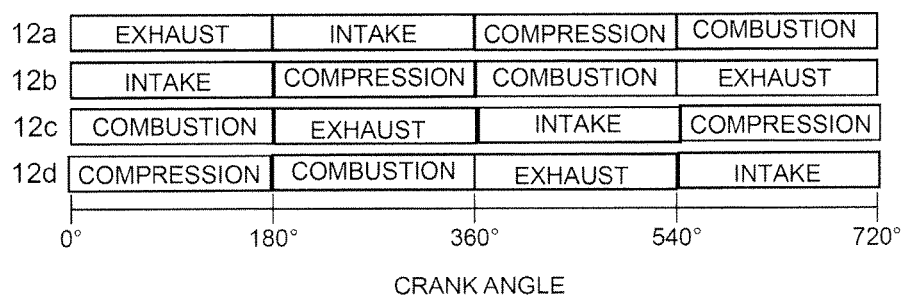
FIG. 4 is a chart illustrating a combustion cycle of each cylinder of the fuel injection device.

In FIG. 3, first of all, the crank angle sensor 36 measures the crank angle at the time when each of the cylinders 12$a$ to 12$d$ is stopped (S10). FIG. 4 illustrates the correlation between the crank angle and strokes in each of the cylinders 12$a$ to 12$d$ (in-line four-cylinders) in a combustion cycle. Here, 12$a$, 12$c$, 12$d$, and 12$b$ are ignited in this order.

Next, the fuel injection control unit 70 determines whether the measured value (fuel pressure at the time when the engine is restarted) obtained by the fuel pressure sensor 56 is equal to or larger than a threshold set in advance (S12). The threshold (predetermined pressure value) is set as appropriate to achieve fuel pressure suitable for the fuel injection, based on the in-cylinder pressure changes, due to the automatic stopping, of which have been recognized in advance from experimental data and the like. When the measured value is equal to or larger than the threshold, a cylinder in which the piston 28 has stopped in a region corresponding to the compression stroke is selected, and the fuel remaining in the high pressure fuel distribution pipe 54 is injected into the cylinder thus selected through the in-cylinder injector 44 (S14→S18). If the fuel can be injected during the compression stroke with the increasing in-cylinder pressure, the combustion in the subsequent combustion stroke occurs in a short period of time. Thus, swift restarting can be achieved.

On the other hand, when the measured value is smaller than the threshold, a cylinder in which the piston 28 has stopped in a region corresponding to the second half of the intake stroke or the first half of the compression stroke is selected, and the fuel remaining in the high pressure fuel distribution pipe 54 is injected into the cylinder thus selected through the in-cylinder injector 44 (S16→S18). The cylinders are selected by the cylinder selection unit 72.

Next, the starter 34 operates upon receiving an instruction from the ECU 60, whereby cranking starts (S20). The relay 64 turns ON upon receiving an instruction from the ECU 60, whereby the low pressure fuel pump 40 is supplied with power from the in-vehicle battery 58 and thus starts operating. The cam mechanism 52 operates in accordance with the operation of the crank shaft 32 as soon as the cranking starts, and thus the intake valve 18 and the exhaust valve 20 operate. When the low pressure fuel pump 40 starts operating, the high pressure fuel pump 50 starts operating in accordance with an operation of the cam mechanism 52 (S22).

At approximately the same time, the ignition plug 66 operates under an instruction from the ECU 60, so that the combustion stroke starts with the fuel injected into the cylinder in S18 ignited (S24). The operations in steps S18 to S24 are performed in an extremely short period of time.

After the low pressure fuel pump 40 and the high pressure fuel pump 50 have started operating, the fuel supplied from the fuel tank 38 is injected into each of the cylinders 12$a$ to 12$d$ from the high pressure fuel distribution pipe 54 through the in-cylinder injector 44, under the instruction from the ECU 60. The number of rotations sensor 37 counts the number of combustion cycles after the restarting. For example, a set number of combustion cycles, such as two to five cycles, are performed (S26). A single combustion cycle involves four strokes including intake, compression, combustion (expansion), and exhaust strokes, and thus the two to five combustion cycles involve eight to 20 strokes.

Next, when the measured value obtained by the intake pressure sensor 24 drops to a threshold (predetermined intake pressure value) (S28), the fuel injection from the high pressure fuel distribution pipe 54 is stopped and switched to the fuel injection from the low pressure fuel distribution pipe 48, by the ECU 60 (S30). Then, the operation of the high pressure fuel pump 50 is stopped (S32). The operation of the high pressure fuel distribution pipe 54 may be continued so that the fuel pressure injection from the high pressure fuel distribution pipe 54 and the fuel pressure injection from the low pressure fuel distribution pipe 48 are concurrently performed.

Figure 5:
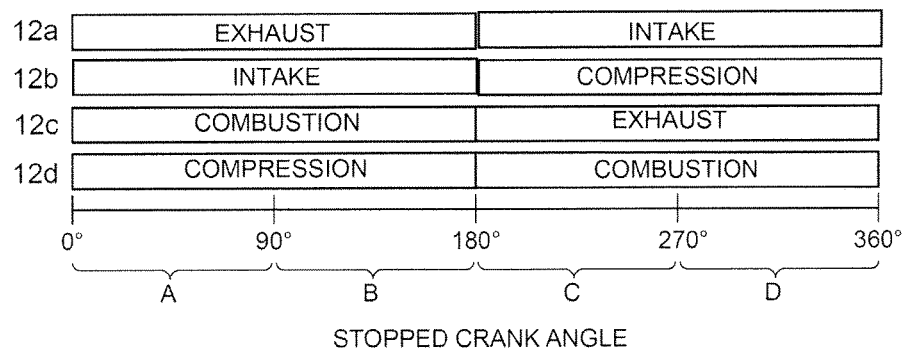
FIG. 5 is a chart illustrating a stopped crank angle of each cylinder of the fuel injection device.

How the cylinder selection unit 72 selects a cylinder into which the fuel is injected from the high pressure fuel distribution pipe 54 at the time of restarting is described in detail with reference to FIG. 5. When the engine is restated with the fuel pressure in the high pressure fuel distribution pipe 54 being equal to or larger than the threshold and the stopped crank angle, that is, a crank angle at the time when the engine has stopped, being in ranges A and B, the fuel can be supplied into a cylinder in the middle of the compression stroke and thus the fuel is injected into the cylinder 12*d*. When the stopped crank angle is in ranges C and D, the fuel is injected into the cylinder 12*b*.

When the engine 10 is restarted with the fuel pressure in the high pressure fuel distribution pipe 54 being smaller than the threshold and with the stopped crank angle, that is, a crank angle at the time when the engine has stopped, being in the range A, the fuel is injected into the cylinder 12*d*. When the stopped crank angle is in the ranges B and C, the fuel is injected into the cylinder 12*b*. When the stopped crank angle is in the range D, the fuel is injected into the cylinder 12*a*. In this manner, the fuel is supplied to a cylinder that is selected as a cylinder to which the fuel can be supplied in accordance with the fuel pressure remaining in the high pressure fuel distribution pipe 54.

In the present embodiment, when the engine 10 is restarted with the idling stop condition no longer satisfied, the fuel remaining in the high pressure fuel distribution pipe 54 is injected into the cylinder by using the fuel pressure of the remaining fuel. Thus, the amount of intake air supplied to the cylinder can be made small, and cooling inside the cylinder can be achieved with the cooling effect of the injected fuel, whereby the knocking can be prevented. Thus, the drivability and the NVH as well as the exhaust gas quality immediately after the starting can be prevented from deteriorating.

The fuel amount used for the automatic restarting can be made small because the fuel injection is performed not from the intake path injector 46 but from the in-cylinder injector 44. More specifically, when injection through the intake path injector 46 is performed for the automatic restarting, the pressure of the intake manifold 14 becomes close to the atmospheric pressure. Thus, fuel attached to the intake port and the like increases. Accordingly, when the injection through the intake path injector 46 is performed for the automatic restarting, a larger fuel amount is required for ensuring the amount of fuel supplied to the in-cylinder than in the case where the injection through the in-cylinder injector 44 is performed.

On the other hand, when the injection through the in-cylinder injector 44 is performed, the fuel attached to the intake port and the like is insignificant. Thus, the automatic restarting can be performed with a smaller amount of fuel and thus with lower fuel consumption (higher fuel efficiency) than in the case where the injection through the intake path injector 46 is performed.

The remaining fuel can be supplied to the selected cylinder without waiting for the operations of the low pressure fuel pump 40 and the high pressure fuel pump 50. Thus, swift restarting can be achieved, and the pump driving friction can be reduced with the low pressure fuel pump 40 and the high pressure fuel pump 50 not operating in this supply period. All things considered, the starting can be achieved with low combustion pressure, whereby the amount of fuel required for combustion can be reduced to achieve high fuel efficiency.

The switching to the fuel injection from the low pressure fuel distribution pipe 48 occurs after the number of combustion cycles, measured by the number of rotations sensor 37, reaches the set number of times and the pressure in the surge tank 22, measured by the intake pressure sensor 24, drops to or below the threshold. Thus, the injection through the intake path injector 46 can be started when an environment is established where the pressure in the intake manifold 14 has changed from the pressure equivalent to the atmospheric pressure to negative pressure, so that the atomization of the fuel injected from the intake path injector 46 is facilitated.

Thus, the exhaust gas quality can be prevented from deteriorating by bad combustion attributable to fuel in a droplet form being injected and supplied into the cylinder from the intake path injector 46. Furthermore, the knocking at the time of starting due to the bad combustion can be prevented, and the NVH can be prevented from deteriorating by the change in the combustion pressure. In addition, there is no risk of knocking caused by increased compression pressure in the cylinder. Furthermore, the switching timing is set based on the two measured values obtained by the fuel pressure sensor 56 and the intake pressure sensor 24. Thus, an optimum switching timing for preventing the knocking from occurring can be achieved.

The threshold is set for the measured value obtained by the fuel pressure sensor 56. When the measured value is equal to or larger than the threshold, the fuel is injected into the cylinder with the stopped crank angle in the region corresponding to the compression stroke. Thus, swift restarting can be achieved with swift transition to the combustion stroke.

When the measured value is smaller than the threshold, the fuel is injected into a cylinder that is in a region corresponding to the second half of the intake stroke or the first half of the compression stroke and thus has low in-cylinder pressure. Thus, the fuel can be easily injected into the cylinder even when the fuel pressure is low.

In the first embodiment, the fuel injection through the in-cylinder injector 44 is switched to the fuel injection through the intake path injector 46 in S30. Alternatively, the fuel injection through the in-cylinder injector 44 may not be stopped in S30 and thus may be concurrently performed with the fuel injection through the intake path injector 46. Thus, the restarting can be more effectively guaranteed.

Second Embodiment

Figure 6:
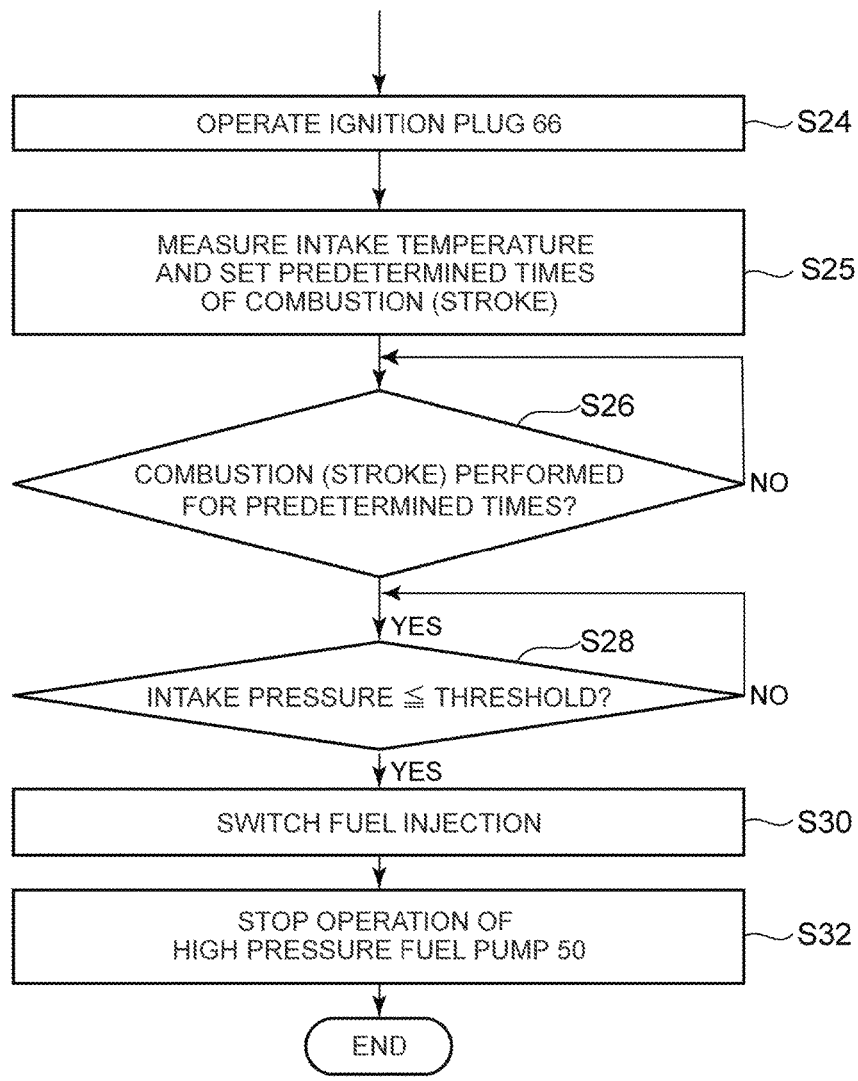
FIG. 6 is a flowchart illustrating a part of a procedure of operations performed by a fuel injection device according to a second embodiment of the present invention.

Next, a second embodiment of the present invention is described with reference to FIG. 6. In the present embodiment, the number of combustion cycles (number of strokes) before the in-cylinder injector 44 is switched to the intake path injector 46 can be changed in accordance with a measured value, representing the intake air temperature, obtained by the intake temperature sensor 26 (S25) after S24 in the first embodiment. The procedure of the other operations (S10 to 24 and S26 to S32) is the same as that in the first embodiment. Furthermore, the device configurations of the engine, the ECU, and the like and the procedure for other operations, such as that for canceling the idling stop, are the same as those in the first embodiment.

In the present embodiment, in S25, the intake temperature sensor 26 measures the temperature of the intake air passing through the intake manifold 14, and the number of combustion cycles (number of strokes) before the in-cylinder injector 44 is switched to the intake path injector 46 is changed in accordance with the intake air temperature. More specifically, higher intake air temperature is more likely to cause knocking at the time of starting. Thus, the knocking is more likely to be caused by the combustion based on the injection through the intake path injector 46. Thus, the number of combustion cycles (strokes) is increased to six to ten combustion cycles in accordance with the intake air temperature measured, so that the injection through the intake path injector 46 starts after the cooling effect in the cylinder is achieved by the injection through the in-cylinder injector 44.

In the present invention, S25 is added to achieve an advantageous effect of more accurately preventing the knocking at the time of restating, in addition to the advantageous effects obtained by the first embodiment.

Third Embodiment

Next, a third embodiment of the present invention is described with reference to FIGS. 4, 5, and 7.

A procedure of operations is described that is for restarting the engine 10 by the control performed by the fuel injection control unit 70, when the idling stop condition that has been satisfied, causing the idling stop/start unit 68 to stop the engine 10, is no longer satisfied.

Figure 7:
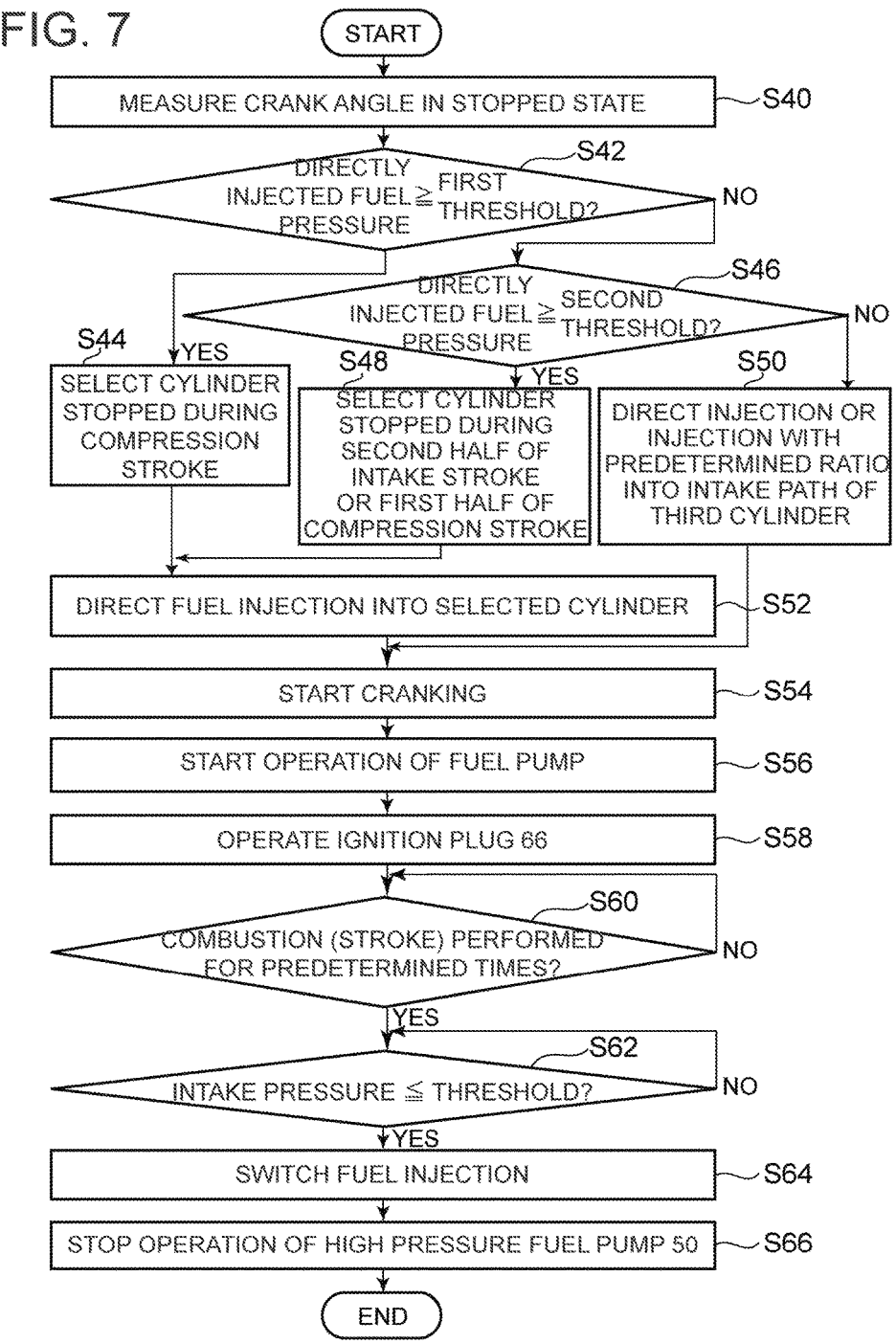
FIG. 7 is a flowchart illustrating a procedure of operations performed by a fuel injection device according to a third embodiment of the present invention.

In FIG. 7, first of all, the crank angle sensor 36 measures the crank angle of each of the cylinders 12*a* to 12*d* in a stopped state (S40). FIG. 4 illustrates the correlation between the crank angle and strokes of each of the cylinders 12*a* to 12*d* (in-line four-cylinders) in a combustion cycle. Here, 12*a*, 12*c*, 12*d*, and 12*b* are ignited in this order.

Next, the fuel injection control unit 70 determines whether the fuel pressure (fuel pressure at the time when the engine is restarted) of the high pressure fuel distribution pipe 54, measured by the fuel pressure sensor 56, is equal to or larger than a first threshold set in advance (S42). The first threshold is set based on the fuel pressure suitable for the fuel injection from the high pressure fuel distribution pipe 54 into the cylinder in which the operation has stopped in a range corresponding to the compression stroke. When the measured value obtained by the fuel pressure sensor 56 is equal to or larger than the first threshold, a first cylinder in which the piston 28 has stopped in the compression stroke is selected. Thus, the fuel remaining in the high pressure fuel distribution pipe 54 is injected into the first cylinder through the in-cylinder injector 44 by using the fuel pressure of the remaining fuel (S44→S52).

When the measured value obtained by the fuel pressure sensor 56 is smaller than the first threshold and is equal to or larger than a second threshold that is lower than the first threshold (S46), a second cylinder in which the piston 28 has stopped in a region corresponding to the second half of the intake stroke or the first half of the compression stroke is selected (S48). Thus, the fuel remaining in the high pressure fuel distribution pipe 54 is injected into the second cylinder through the in-cylinder injector 44 by using the fuel pressure of the remaining fuel (S52). The second threshold is set based on fuel pressure that is lower than the first threshold and is suitable for the fuel injection into a cylinder in which the operation has stopped in the range corresponding to the second half of the intake stroke or the first half of the compression stroke.

When the measured value obtained by the fuel pressure sensor 56 is smaller than the second threshold, a third cylinder in which the operation has stopped in a region corresponding to immediately before the intake stroke or the first half of the intake stroke. Thus, the fuel is supplied to the intake path of the third cylinder from the low pressure fuel distribution pipe 48 through the intake path injector 46 (S50). The cylinders are selected by the cylinder selection unit 73.

An alternative control method may be employed where the fuel injection from the high pressure fuel distribution pipe 54 to the third cylinder and the fuel injection from the low pressure fuel distribution pipe 48 to the third cylinder are concurrently performed. In such a case, a fuel injection amount ratio may be set with the amount of the fuel injection from the low pressure fuel distribution pipe 48 being larger than the amount of the fuel injection from the high pressure fuel distribution pipe 54. For example, 6:4 or 7:3 is set as the ratio of the amount of the fuel injection from the low pressure fuel distribution pipe 48 to the amount of the fuel injection from the high pressure fuel distribution pipe 54.

Next, the starter 34 operates upon receiving an instruction from the ECU 60, whereby cranking starts with the crank shaft 32 rotated (S54). The relay 64 turns ON in accordance with the start of cranking and upon receiving an instruction from the ECU 60, whereby the low pressure fuel pump 40 is supplied with power from the in-vehicle battery 58 and thus starts operating. The cam mechanism 52 operates in accordance with the operation of the crank shaft 32 as soon as the cranking starts, and the intake valve 18 and the exhaust valve 20 operate in accordance with the cam mechanism 52 while the high pressure fuel pump 50 starts operating (S56).

At a timing approximately the same as that of the step described above, the ignition plug 66 operates upon receiving an instruction from the ECU 60, whereby the fuel injected into the cylinder in S52 is ignited, so that the combustion stroke starts (S58). The operations in steps S54 to S58 are performed in an extremely short period of time.

After the low pressure fuel pump 40 and the high pressure fuel pump 50 have started operating, the fuel supplied from the fuel tank 38 is injected into each of the cylinders 12*a* to 12*d* from the high pressure fuel distribution pipe 54 through the in-cylinder injector 44, under the instruction from the ECU 60. The number of rotations sensor 37 counts the number of combustion cycles after the restarting. For example, a set number of combustion cycles, such as two to five cycles, are performed (S60). Then, when the measured value obtained by the intake pressure sensor 24 drops to a threshold (S62), the fuel injection from the high pressure fuel distribution pipe 54 is stopped and switched to the fuel injection from the low pressure fuel distribution pipe 48, by the ECU 60 (S64). Then, the operation of the high pressure fuel pump 50 is stopped (S66).

The operation of the high pressure fuel distribution pipe 54 may be continued so that the fuel pressure injection from the high pressure fuel distribution pipe 54 and the fuel pressure injection from the low pressure fuel distribution pipe 48 are concurrently performed.

How the cylinder selection unit 73 selects the cylinder into which the fuel is injected from the in-cylinder injector 44 at the time of restarting is described in detail with reference to FIG. 5. When the engine 10 is restated with the fuel pressure, in the high pressure fuel distribution pipe 54, being equal to or higher than a first threshold and the stopped crank angle, at the time when the engine has stopped, being in ranges A and B, the fuel can be supplied into a cylinder in the middle of the compression stroke and thus the fuel is injected into the cylinder 12*d*. When the stopped crank angle is in ranges C and D, the fuel is injected into the cylinder 12*b*.

When the engine 10 is restarted with the fuel pressure, in the high pressure fuel distribution pipe 54, being lower than the first threshold and equal to or larger than the second threshold and with the stopped crank angle, at the time when the engine has stopped, being in the range A, the fuel is injected into the cylinder 12*d* that is in a region corresponding to the first half of the compression stroke and thus has low in-cylinder pressure. When the stopped crank angle is in the ranges B and C, the fuel is injected into the cylinder 12*b*.

When the stopped crank angle is in the range D, the fuel is injected into the cylinder 12a. In this manner, the fuel is supplied to a cylinder that is selected as the cylinder to which the fuel can be supplied in accordance with the fuel pressure in the high pressure fuel distribution pipe 54.

Thus, when the engine 10 is restarted with the idling stop condition no longer satisfied, the fuel remaining in the high pressure fuel distribution pipe 54 is injected through the in-cylinder injector 44. Thus, the amount of intake air supplied to the cylinder can be made small, and cooling inside the cylinder can be achieved with the cooling effect of the injected fuel, whereby the knocking can be prevented. Thus, the drivability and NVH as well as the exhaust gas quality immediately after the starting can be prevented from deteriorating.

The fuel amount used for the automatic restarting can be made small because the fuel injection is performed not through the intake path injector 46 but through the in-cylinder injector 44. More specifically, when injection through the intake path injector 46 is performed for the automatic restarting, the pressure in the intake manifold 14 becomes close to the atmospheric pressure. Thus, fuel attached to the intake port and the like increases.

Accordingly, when the injection through the intake path injector 46 is performed for the automatic restarting, a larger fuel amount is required for ensuring the amount of fuel supplied to the in-cylinder than in the case where the injection through the in-cylinder injector 44 is performed.

On the other hand, when the injection through the in-cylinder injector 44 is performed, the fuel attached to the intake port and the like is insignificant. Thus, the automatic restarting can be achieved with a smaller amount of fuel and thus with lower fuel consumption (higher fuel efficiency) than in the case where the injection through the intake path injector 46 is performed.

The remaining fuel can be supplied to the selected cylinder without waiting for the operations of the low pressure fuel pump 40 and the high pressure fuel pump 50. Thus, swift restarting can be achieved, and the pump driving friction can be reduced with the period involving no operations of the low pressure fuel pump 40 and the high pressure fuel pump 50. All things considered, the starting can be achieved with low combustion pressure, whereby the amount of fuel required for the combustion can be reduced to achieve high fuel efficiency.

When the engine 10 is restarted, the cylinder with the in-cylinder pressure suitable for the injection of the remaining fuel is selected in accordance with the fuel pressure of the fuel remaining in the high pressure fuel distribution pipe 54 thus measured, and the remaining fuel is injected into the selected cylinder. Thus, the fuel can be surely injected into the cylinder even when the fuel pressure is low. When the fuel pressure is high, the remaining fuel is injected into the cylinder in which the operation has stopped during the compression stroke. Thus, the swift transition to the combustion stroke and swift restarting can be achieved.

The thresholds are set in two stages for the fuel pressure for selecting the cylinder into which the remaining fuel is injected, so that cylinder can be selected in detail based on the fuel pressure. Thus, the fuel injection into the cylinder can be more effectively guaranteed. When the fuel pressure is lower than the second threshold, the fuel is injected from the low pressure fuel supply pipe 42 into the intake path of the cylinder in which the operation has stopped in the region corresponding to immediately before the intake stroke or the first half of the intake stroke. The fuel supplied to the intake path can be surely injected into the cylinder with the suction effect of the cylinder in which the cranking has started.

When the fuel pressure is lower than the second threshold, the fuel injection into the intake path and the direct fuel injection into the cylinder in which the operation has stopped in the region corresponding to the second half of the intake stroke or the first half of the compression stroke are concurrently performed for injecting a small amount of fuel into the cylinder. Thus, the fuel can be injected into the cylinder even when the fuel pressure of the fuel remaining in the high pressure fuel distribution pipe 54 is low. With the fuel injected from both fuel supply paths as described above, swift restarting can be achieved with the fuel ignition guaranteed.

The ratio of the amounts of fuel injected from both fuel supply paths is set in such a manner that the less amount of fuel is injected from the high pressure fuel distribution pipe 54 than that from the low pressure fuel supply pipe 42. Thus, the amount of fuel injected from the high pressure fuel distribution pipe 54 can be made small. All things considered, the fuel can be surely and easily injected into the cylinder even when the fuel pressure in the high pressure fuel distribution pipe 54 is low.

The fuel injection from the high pressure fuel distribution pipe 54 is switched to that from the low pressure fuel supply pipe 42, when the number of combustion cycles, counted by the number of rotations sensor 37, reaches the set number and the pressure in the surge tank 22, measured by the intake pressure sensor 24, drops to or below the threshold. Thus, a timing optimum for preventing the knocking from occurring due to the rise in the compression pressure in the cylinder can be achieved.

Fourth Embodiment

Next, a fourth embodiment of the present invention is described below with reference to FIGS. 8 and 9.

A procedure of operations performed by the idling stop/start unit 68 to stop the engine 10 when the idling stop condition is satisfied is described with reference to FIG. 8.

Figure 8:
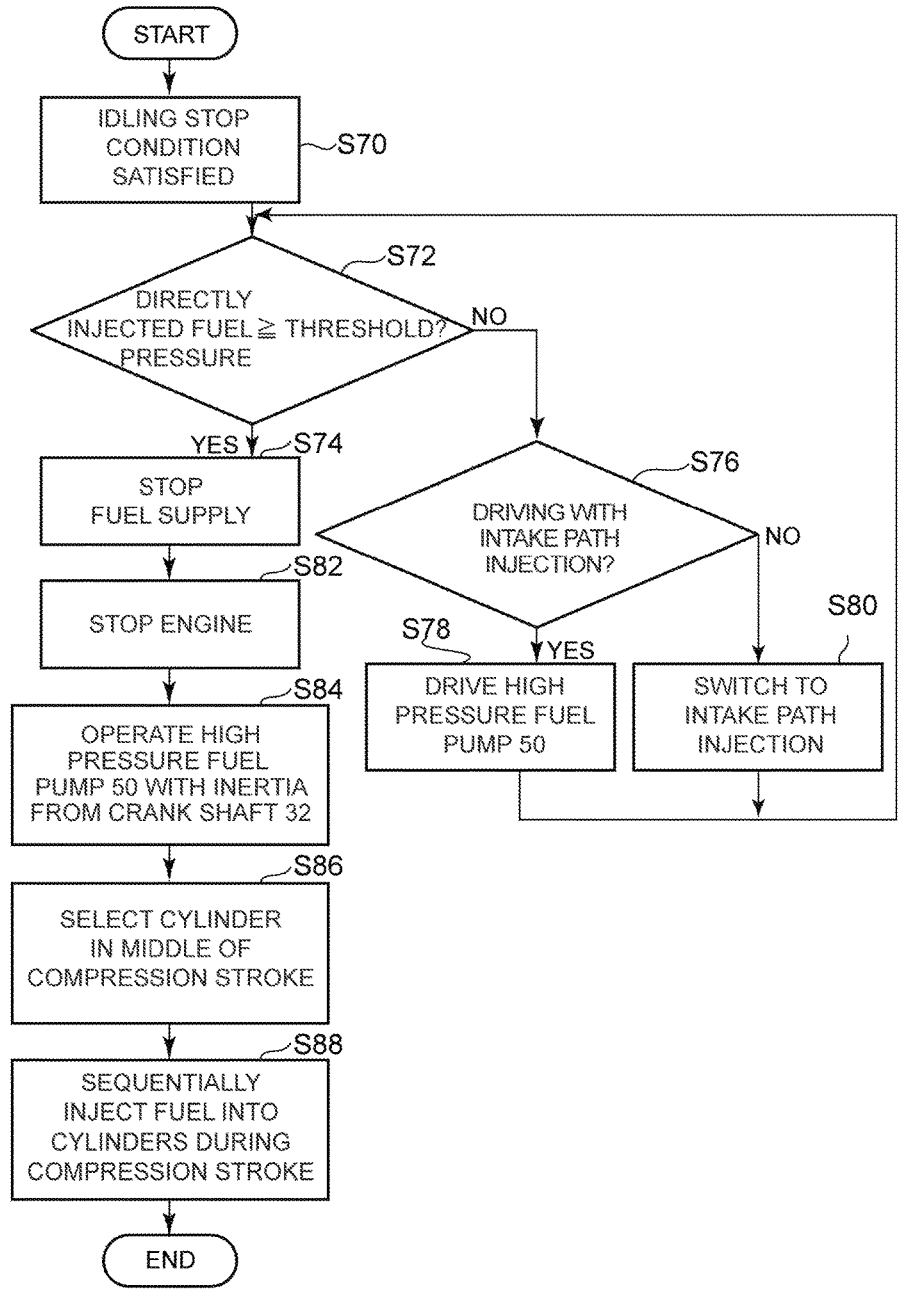
FIG. 8 is a flowchart illustrating a procedure of operations performed by a fuel injection device according to a fourth embodiment of the present invention.

In FIG. 8, when the idling stop condition is satisfied (S70), first of all, whether the fuel pressure in the high pressure fuel distribution pipe 54 is equal to or larger than the threshold is determined (S72). The threshold is set based on whether the fuel can be injected into each of the cylinders 12a to 12d from the high pressure fuel distribution pipe 54 when the engine 10 is restarted with the idling stop condition no longer satisfied, that is, with a restarting condition satisfied.

When the fuel pressure in the high pressure fuel distribution pipe 54 is equal to or larger than the threshold, the fuel injection control unit 70 immediately stops the low pressure fuel pump 40 and the high pressure fuel pump 50, so that the fuel supply to each of the cylinders 12a to 12d stops (S74). Thus, the friction due to the operation (action) of the high pressure fuel pump 50 can be reduced. Then, the idling stop/start unit 68 stops the operation of the engine 10 (S82).

When the fuel pressure in the high pressure fuel distribution pipe 54 is smaller than the threshold (S72) and the engine 10 is in a driving state involving fuel injection through the intake path injector 46 (S76), the high pressure fuel pump 50 is further driven (S78). Through this operation, the fuel pressure in the high pressure fuel distribution pipe 54 rises.

Figure 9:
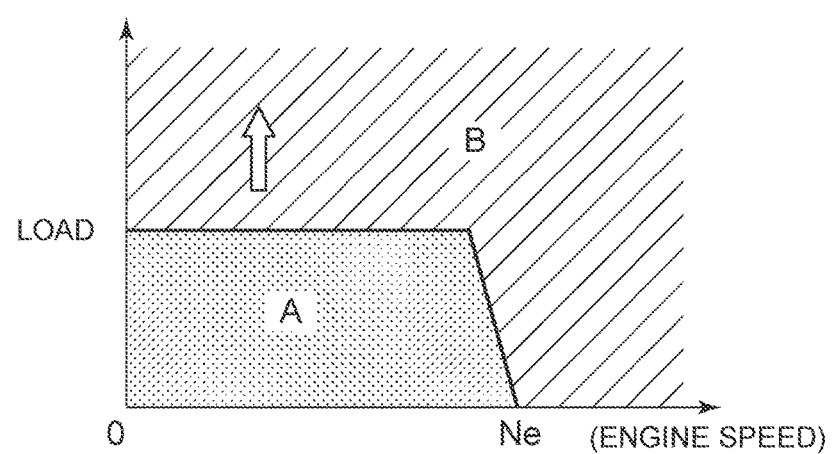
FIG. 9 is a graph illustrating a method for driving an engine.

As illustrated in FIG. 9, in the present embodiment, the fuel injection through the intake path injector 46 is performed in a low speed-low load range, and the fuel injection through the in-cylinder injector 44 starts when driving transitions to the high speed-high load region. Thus, the driving in the low load region involves no operation of the high pressure fuel pump 50, whereby low friction in the low load range can be achieved. Furthermore, in-cylinder cooling effect by the in-cylinder injector 44 can be obtained in the high load range.

A portion close to the low speed-low load range in the high speed-high load range involves no change in the ratio of the fuel injection amount from the intake path injector 46 to the fuel injection amount from the in-cylinder injector 44. The fuel injection amount from the in-cylinder injector 44 increases along with the transitioning to the high load region.

In the present embodiment, for example, the injection through the in-cylinder injector 44 is performed even in a low load state when catalyst temperature rises (not illustrated) or the automatic restarting is performed. In this configuration, when the idling stop condition is satisfied and the fuel pressure in the high pressure fuel distribution pipe 54 is smaller than the threshold (S72), whether the injection using only the intake path injector 46 is performed is determined (S76). When the fuel injection is not performed only by using the intake path injector 46, the fuel injection through the in-cylinder injector 44 is stopped and is switched to the fuel injection through the intake path injector 46 (S80). With the fuel injection through the in-cylinder injector 44 stopped and switched to the fuel injection through the intake path injector 46 as described above in accordance with the operation (action) of the high pressure fuel pump 50, the fuel pressure of the high pressure fuel distribution pipe 54 can be swiftly raised.

When the fuel pressure in the high pressure fuel distribution pipe 54 is raised to or above the threshold through such an operation, the fuel supply to each of the cylinders 12a to 12d is stopped (S74) and the idling stop/start unit 68 stops the operation of the engine 10 (S82).

The high pressure fuel pump 50 operates in accordance with an operation of the crank shaft 32 via the cam mechanism 52. Thus, the high pressure fuel pump 50 is operated by inertia due to rotation of the crank shaft 32 after the engine 10 has stopped (S84). Thus, the fuel pressure in the high pressure fuel distribution pipe 54 can be further raised.

When the idling stop condition is no longer satisfied and the accelerator, a steering wheel, and the like are operated so that the restarting condition is satisfied, the cylinder selection unit 72 or 73 selects a cylinder in the middle of the compression stroke from the cylinders 12a to 12d (S86). Then, the fuel is injected from the in-cylinder injector 44 into the selected cylinder. In this manner, the fuel is sequentially injected into the cylinders in the middle of the compression stroke to restart the engine 10 (S88).

In the present embodiment, when the engine stops due to the idling stop, the fuel pressure in the high pressure fuel distribution pipe 54 is raised to or above the threshold, so that the fuel remaining in the high pressure fuel distribution pipe 54 is injected into the cylinder for several combustion cycles after the initial explosion in the restarting. Thus, the amount of intake air supplied to the cylinder can be made small, and the inside of the cylinder can be cooled by the injected fuel.

Thus, the compression pressure is prevented from rising in the cylinder so that the knocking can be prevented from occurring, whereby the drivability and the NVH as well as the exhaust gas quality immediately after the starting can be prevented from deteriorating. The fuel is injected not from the intake manifold 14 but from the high pressure fuel distribution pipe 54 at the time of the restarting. Thus, a low air-fuel ratio can be achieved to improve the ignition performance. When the engine 10 is restarted, the fuel can be injected into the cylinder without waiting for the operations of the low pressure fuel pump 40 and the high pressure fuel pump 50. Thus, swift starting can be achieved, and with the period involving no operations of the low pressure fuel pump 40 and the high pressure fuel pump 50, the pump driving friction can be reduced, whereby the fuel efficiency can be improved.

When the fuel pressure in the high pressure fuel distribution pipe 54 is smaller than the threshold after the idling stop condition is satisfied, the fuel pressure in the high pressure fuel distribution pipe 54 is raised mainly by the driving of the low pressure fuel pump 40, and thus can be efficiently raised. The high pressure fuel pump 50 is not operated so that the pump driving friction can be reduced, whereby the fuel efficiency can be improved.

When the measured value obtained by the fuel pressure sensor 56 after the idling stop condition has been satisfied is smaller than the threshold while the low pressure fuel pump 40 is operating, the high pressure fuel pump 50 is additionally operated. Thus, the fuel pressure in the high pressure fuel distribution pipe 54 can be easily raised. When the low pressure fuel pump 40 is not operating, the high pressure fuel pump 50 is operated, and the fuel injection through the in-cylinder injector 44 is stopped and switched to the fuel injection through the intake path injector 46. Thus, the fuel pressure in the high pressure fuel distribution pipe 54 can be swiftly raised.

The fuel is injected into the cylinder in the middle of the compression stroke at the time of restarting, whereby even more swift restarting can be achieved. Thus, the knocking can be more effectively prevented, whereby the NVH immediately after the starting can be prevented.

The driving is performed with the fuel injection through the intake path injector 46 performed in the low speed-low load region (range A) of the engine 10, whereby fuel and the intake air are evenly mixed so that the excellent combustion can be maintained. The driving in the range A involves no operation of the high pressure fuel pump 50, whereby the pump driving friction can be reduced.

With the high pressure fuel pump 50 driven by the inertia due to rotation of the crank shaft 32 after the engine 10 has stopped, the fuel pressure in the high pressure fuel distribution pipe 54 can further be raised and the pump power can be saved.

INDUSTRIAL APPLICABILITY

At least one embodiment of the present invention can achieve swift restating after idling stop is terminated and prevent knocking from occurring at the time of restating in an internal combustion engine for a vehicle, so that drivability and NVH can be prevented from deteriorating and exhaust gas quality can be prevented from deteriorating, and thus is suitable for a vehicle in which an idling stop/start mechanism is installed.

REFERENCE SIGNS LIST

10 petrol engine
12a, 12b, 12c, 12d cylinder
14 intake manifold
16 exhaust manifold
18 intake valve 20 exhaust valve
22 surge tank
24 intake pressure sensor
26 intake temperature sensor
28 piston
30 crank chamber
32 crank shaft
34 starter
36 crank angle sensor
37 number of rotations sensor
38 fuel tank
40 low pressure fuel pump
42 low pressure fuel supply pipe (second fuel injection unit)
44 in-cylinder injector
46 intake path injector
48 low pressure fuel distribution pipe (second fuel injection unit)
50 high pressure fuel pump
52 cam mechanism
53 high pressure fuel supply pipe (first fuel injection unit)
54 high pressure fuel distribution pipe (first fuel injection unit)
56 fuel pressure sensor
58 in-vehicle battery
60 ECU
62 ignition switch
64 relay
66 ignition plug
68 idling stop/start unit (automatic restarting unit)
70 fuel injection control unit
72, 73 cylinder selection unit
c combustion chamber

The invention claimed is:

1. A fuel injection device for a multi-cylinder internal combustion engine, the fuel injection device comprising:
    a first fuel injection unit configured to inject fuel into a cylinder of the internal combustion engine;
    a second fuel injection unit configured to inject fuel into an intake path of the internal combustion engine;
    a crank angle sensor that detects a crank angle of the internal combustion engine;
    a fuel pressure sensor configured to measure pressure of the fuel supplied to the first fuel injection unit;
    an automatic restarting unit configured to automatically restart the internal combustion engine; and
    a fuel injection control unit measuring whether the measured pressure of the fuel of the first fuel injection unit is equal to or larger than a predetermined value, and selecting
        a cylinder stopped in a region corresponding to one of a compression stroke and a second half of an intake stroke detected by the crank angle sensor when the internal combustion engine is stopped, when the measured pressure is equal to or larger than the predetermined pressure; the control unit injecting fuel remaining in the first fuel injection unit to be injected into the selected cylinder before rotation of a crank shaft starts so that the internal combustion engine is automatically restarted when the internal combustion engine is to be automatically started; and starting a fuel injection from the second fuel injection unit
        when a predetermined condition is satisfied after the internal combustion engine is restarted as a result of the automatic restart of the engine.

2. The fuel injection device for an internal combustion engine according to claim 1,
    wherein the predetermined condition includes detecting by the crank angle sensor that a predetermined number of strokes has been completed after the internal combustion engine being restarted.

3. The fuel injection device for an internal combustion engine according to claim 2,
    wherein the internal combustion engine further comprises an intake pressure sensor configured to measure intake pressure in the intake path, and
    wherein the predetermined condition includes a detected value from the intake pressure sensor being equal to or smaller than a predetermined intake pressure value.

4. The fuel injection device for an internal combustion engine according to claim 3,
    wherein the internal combustion engine further comprises an intake temperature sensor configured to measure a temperature of intake air in the intake path, and
    wherein the fuel injection control unit is configured to cause the second fuel injection unit to start injecting the fuel while changing the predetermined number of strokes in accordance with a detected result from the intake temperature sensor.

5. The fuel injection device for an internal combustion engine according to claim 1,
    wherein the fuel injection control unit is configured to select, if the pressure of the fuel of the first fuel injection unit which is the measured value obtained by the fuel pressure sensor is smaller than the predetermined value, a cylinder stopped in a region corresponding to one of immediately before the intake stroke and a first half of the intake stroke where the fuel remaining in the second fuel injection unit can be injected into the cylinder with suction effect of the cylinder, determined based on the crank angle detected by the crank angle sensor when the internal combustion engine is stopped, and cause, when the internal combustion engine is to be automatically restarted, fuel remaining in the second fuel injection unit to be injected into the intake path of the selected cylinder before rotation of the crank shaft starts so that the internal combustion engine is automatically restarted.

6. The fuel injection device for an internal combustion engine according to claim 5,
    wherein the predetermined value includes a first threshold value and a second threshold value which is lower than the first threshold value;
    wherein the fuel injection control unit is configured to
    select a first cylinder in which an operation has stopped during the compression stroke when the fuel pressure of the first fuel injection unit is equal to or larger than the first threshold value;
    select a second cylinder in which an operation has stopped in a region corresponding to one of the second half of the intake stroke and a first half of the compression stroke when the fuel pressure of the first fuel injection unit is equal to or larger than a second threshold that is lower than the first threshold value;
    select a third cylinder in which an operation has stopped in the region corresponding to immediately before the intake stroke or the first half of the intake stroke when the fuel pressure of the first injection unit is smaller than the second threshold value; and
    cause the fuel remaining in the second fuel injection unit to be injected into the intake path of the third cylinder.

7. The fuel injection device for an internal combustion engine installed in a vehicle according to claim 1, further comprising:

an automatic stopping unit configured to automatically stop the internal combustion engine when a predetermined condition is satisfied; and a high pressure fuel pump configured to send the fuel to the first fuel injection unit, wherein the fuel injection control unit is configured to cause, when the predetermined condition for automatic stopping is satisfied while the internal combustion engine is driven by the second fuel injection unit, the high pressure fuel pump to operate so that pressure of the fuel remaining in the first fuel injection unit rises, before the automatic stopping unit stops the internal combustion engine.

8. The fuel injection device for an internal combustion engine installed in a vehicle according to claim 7, wherein the second fuel injection unit is stopped so that the internal combustion engine is stopped, when a measured value from the fuel pressure sensor is equal to or larger than a predetermined pressure value, and wherein the high pressure fuel pump is operated until rotation of the internal combustion engine stops when the measured value from the fuel pressure sensor is smaller than the predetermined pressure value.

9. The fuel injection device for an internal combustion engine according to claim 1, wherein the fuel injection control unit is configured to drive the internal combustion engine by using the second fuel injection unit when the internal combustion engine is in a low load state.

* * * * *